United States Patent
Hutzler et al.

(10) Patent No.: US 8,915,971 B2
(45) Date of Patent: Dec. 23, 2014

(54) SECURITY DEVICE FOR ELECTRONICS

(75) Inventors: Richard Hutzler, Ocean Shores, WA (US); William M. Smith, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 13/041,183

(22) Filed: Mar. 4, 2011

(65) Prior Publication Data

US 2012/0226910 A1   Sep. 6, 2012

(51) Int. Cl.
- G06F 21/00 (2013.01)
- G06F 21/88 (2013.01)
- G06F 21/57 (2013.01)

(52) U.S. Cl.
CPC .............. G06F 21/575 (2013.01); G06F 21/88 (2013.01)
USPC ........................................................ 726/35

(58) Field of Classification Search
None
See application file for complete search history.

(56) References Cited

U.S. PATENT DOCUMENTS

| | | | |
|---|---|---|---|
| 5,675,321 A | 10/1997 | McBride | |
| 6,199,163 B1 * | 3/2001 | Dumas et al. | 713/183 |
| 6,216,230 B1 * | 4/2001 | Rallis et al. | 713/185 |
| 6,297,735 B1 | 10/2001 | Abel | |
| 6,389,853 B1 | 5/2002 | Pate et al. | |
| 6,459,374 B1 | 10/2002 | Rand et al. | |
| 6,756,704 B2 | 6/2004 | Milojicic et al. | |
| 7,024,698 B2 | 4/2006 | Tanaka et al. | |
| 7,362,227 B2 | 4/2008 | Kim | |
| 7,515,048 B1 | 4/2009 | Bhattiprolu et al. | |
| 7,543,467 B2 | 6/2009 | Sheehan | |
| 7,696,857 B2 | 4/2010 | Kritt et al. | |
| 7,701,339 B2 | 4/2010 | Irmscher et al. | |
| 8,181,028 B1 * | 5/2012 | Hernacki et al. | 713/182 |
| 2002/0113704 A1 | 8/2002 | Hess | |
| 2003/0065934 A1 | 4/2003 | Angelo et al. | |
| 2006/0123242 A1 | 6/2006 | Merrem | |
| 2006/0250240 A1 | 11/2006 | Merrem et al. | |
| 2008/0001705 A1 | 1/2008 | Kritt et al. | |
| 2008/0028477 A1 | 1/2008 | Lehmann et al. | |
| 2008/0110217 A1 | 5/2008 | Andrews et al. | |
| 2008/0120716 A1 * | 5/2008 | Hall et al. | 726/16 |
| 2008/0140967 A1 * | 6/2008 | Breslau et al. | 711/163 |
| 2008/0178304 A1 * | 7/2008 | Jeansonne et al. | 726/34 |
| 2008/0295184 A1 * | 11/2008 | Su | 726/35 |

(Continued)

OTHER PUBLICATIONS

Intel Corporation (2010). Protect Laptops and Data with Intel@ Anti-Theft Technology. Intel.com. [recieved information on Jun. 24, 2010].

*Primary Examiner* — David Pearson
(74) *Attorney, Agent, or Firm* — Kunzler Law Group

(57) ABSTRACT

A lock and modular system for securing an electronic device. The system includes a device security module that couples to an electronic device and secures the electronic device to its location. A monitor module ensures that the device security module is coupled to the electronic device before a data security module allows the electronic device to operate. The monitor module may also require that the device security module be recognized before the electronic device will operate. If the device security module is coupled and recognized, the user is prompted to provide an encryption key. If the key is correct, the electronic device will operate. The user may have a limited number of attempts to provide the encryption key. If the user makes too many attempts, the electronic device is disabled and the data thereon destroyed. If the device security module is uncoupled during operation, the electronic device is shut down.

18 Claims, 6 Drawing Sheets

(56) References Cited

U.S. PATENT DOCUMENTS

| | | |
|---|---|---|
| 2009/0189765 A1 | 7/2009 | Lev et al. |
| 2009/0267766 A1 | 10/2009 | Pasma |
| 2010/0014676 A1* | 1/2010 | McCarthy et al. ............ 380/277 |
| 2010/0071077 A1 | 3/2010 | Morris et al. |
| 2010/0147041 A1 | 6/2010 | Teicher et al. |
| 2012/0176243 A1 | 7/2012 | Andersen |
| 2012/0223837 A1 | 9/2012 | Hutzler et al. |
| 2012/0226910 A1 | 9/2012 | Hutzler |

* cited by examiner

SECURITY DEVICE FOR ELECTRONICS

FIELD

The subject matter disclosed herein relates to external and internal security devices for electronic devices.

BACKGROUND

Description of the Related Art

A downside to the growing trend of smaller, lighter, and more portable electronic devices is the increasing ease with which such devices can be stolen. Laptop computers, smart phones, personal digital assistants (PDAs), and even desktop computers can often be fit into a backpack and quietly taken. Theft, of course, represents a significant cost to the owners of these often expensive devices.

Sadly, the value of the hardware that is stolen is increasingly the smaller concern. As our lives become increasingly intertwined with our electronic devices, our electronic devices contain more and more information about us. Personal information, including social security numbers, credit card numbers, and other identifying information and financial data may be used to cause monetary damage greater than the value of the device that was stolen. This may be particularly true in business settings. For example, a doctor's office may have a laptop in an exam room that is used to operate medical testing equipment. If the laptop is stolen, the loss of the patient data contained on the laptop (and the attendant problems with HIPPA and the obligation to protect patient information) may be far more worrisome to the doctor's office then the cost of the equipment.

BRIEF SUMMARY

An approach to securing an electronic device is presented. In one embodiment, the electronic device is secured using a lock that includes a device security module, a monitor module, and a data security module. The device security module may couple to the electronic device and secure the electronic device to a physical location. The monitor module determines whether the device security module is coupled to the electronic device. The data security module prevents the electronic device from operating if the device security module is not coupled to the electronic device. The data security module may communicate with the basic input output system (BIOS) of the electronic device and prevent the electronic device from operating by stopping the BIOS. The data security module may, for example, prevent the electronic device from operating by stopping the BIOS initialization.

The monitor module may also determine whether the device security module is recognized. The device security module may share an authentication code with the monitor module, which may use the authentication code to determine whether the device security module is recognized. If the device security module is not recognized, the data security module may prevent the electronic device from operating. The data security module may be configured to fit within the electronic device.

The electronic device may have a storage device for storing data. The lock may also include a storage device security module that encrypts data on the electronic device with an encryption key. The storage device security module may be firmware that operates on the storage device.

The data security module may require that the user provide the encryption key before startup of the electronic device. The data security module may also limit the number of attempts by a user to enter the encryption key to a threshold attempt number. The data security module may disable the BIOS if the user makes a number of attempts in excess of the threshold attempt number.

The storage device security module may also limit the number of attempts by a user to enter the encryption key. If the user makes too many attempts, the storage device security module may destroy data on the storage device. The storage device security module may logically destroy the data, or in certain embodiments may physically destroy the storage device.

As discussed above, a locking system may include a device security module that is external to the electronic device and a data security module that is internal to the electronic device. The device security module may couple with the electronic device by way of the data security module. A storage device security module may operate on the storage device of the electronic device. The electronic device may be, in certain embodiments, a laptop computer, a cellular phone, a desktop computer, or a personal digital assistant (PDA).

The present invention may comprise a computer program product for securing an electronic device. The computer program product may include instructions for determining whether the device security module is coupled to the electronic device, and determining whether the device security module is recognized. The instructions may also include prompting the user for an encryption key prior to start up of the electronic device. The instructions may also include starting the electronic device and encrypting and decrypting the data if it is determined that the device security module is coupled to the electronic device, and the device security module is recognized.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
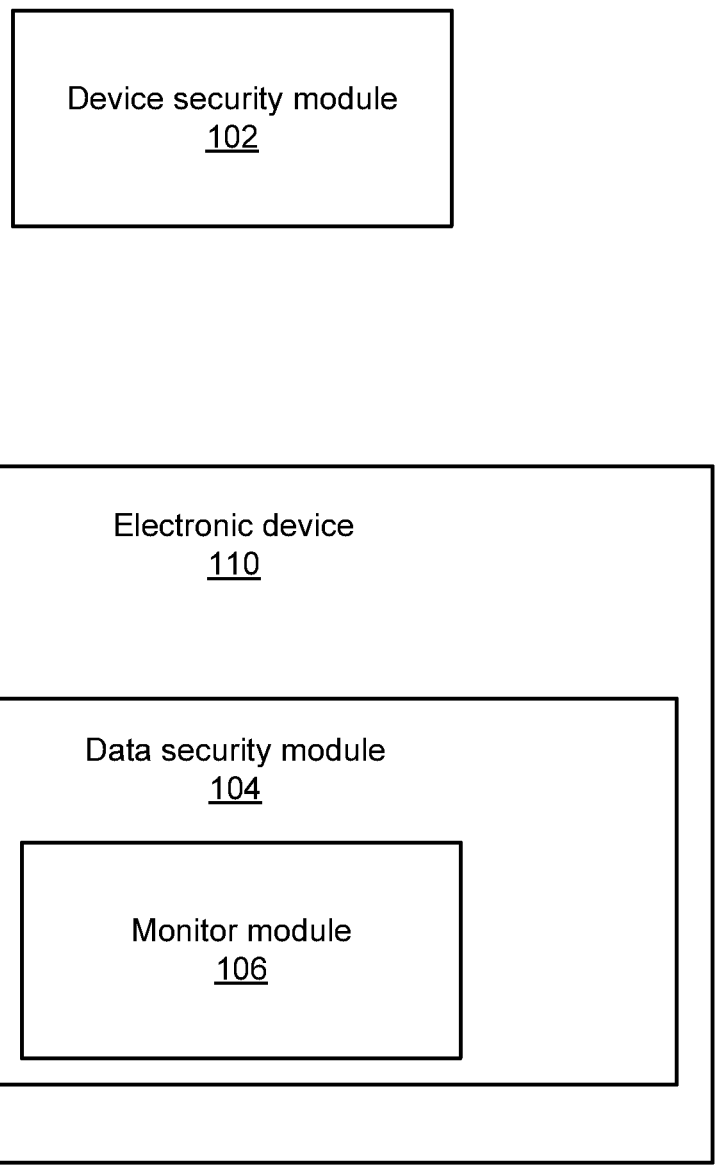
FIG. 1 is a schematic block diagram illustrating an embodiment of a system with a device security module and an electronic device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 that includes a device security module 102, an electronic device 110, a data security module 104, and a monitor module 106. The device security module 102 couples to the electronic device 110 and secures the electronic device 110 to a physical location. As used in this application, "couple" means to join or connect either directly or indirectly through intermediate components. The device security module 102 may, for example, include a cable that can be fastened to a physical feature of the environment (such as a table leg, a desk, a pillar, or other feature) and a lock that couples the device security module 102 to the electronic device 110. When the electronic device 110 is secured, it is protected against potential thieves. In one embodiment, the device security module 102 secures the electronic device 110 by physically fastening the electronic device 110 to a physical feature (such as a table leg or a pole) at the location.

The electronic device 110 is any physical device that is capable of storing data. The electronic device 110 may be a laptop computer, a cellular phone (including smart phones), a desktop computer, a personal digital assistant (PDA), a tablet, a disk drive, a flash drive, or other electronic device. The electronic device 110 may not be designed to be portable; for example, the tower portion of a desktop computer may be the electronic device 110. In many instances, the electronic device 110, in addition to its worth as an electronic device, contains sensitive data.

The system 100 may also contain a data security module 104. In certain embodiments, the data security module 104 is internal to the electronic device 110. The data security module 104 may be, for example, a card that connects to a motherboard of an electronic device 110. The data security module 104 may be a component built into and permanently affixed to the electronic device 110. The data security module 104 may include hardware, software, and/or firmware to perform one or more functions for increasing the security of the electronic device 110.

In certain embodiments, the data security module 104 includes a monitor module 106. The monitor module 106 may be part of the data security module 104, or may be implemented separately from the data security module 104. The monitor module 106 determines whether the device security module 102 is coupled to the electronic device 110. In one embodiment, the monitor module 106 comprises one or more sensors to determine whether the device security module 102 is coupled to the electronic device 110. The monitor module 106 may use proximity sensors to determine whether the device security module 102 is attached. Proximity sensors may be located within the device security module 102 and the data security module 104. In certain embodiments, the monitor module 106 may use physical pins to detect the presence of the device security module 102. For example, the device security module 102 may include a locking lug and the data security module 104 may include a locking lug receptacle as discussed and shown in FIG. 3. In such embodiments, a mechanical sensor may be used to determine whether the locking lug is properly secured to the locking lug receptacle. Other approaches to determining whether the device security module 102 is coupled to the electronic device 110 can also be used.

The data security module 104 prevents the electronic device 110 from operating if the device security module 102 is not coupled to the electronic device 110. The monitor module 106 may communicate whether or not the device security module 102 is coupled to the electronic device 110 to the data security module 104. Preventing the electronic device 110 from operating means that the data security module 104 prevents the electronic device 110 from operating normally and providing access to data stored on the storage device of the electronic device 110. In one embodiment, the data security module 104 prevents the electronic device 110 from loading the operating system of the electronic device 110. The data security module 104 may prevent the basic input output system (BIOS) from loading and starting the operating system. In certain embodiments, the data security module 110 prevents the electronic device 110 from even being powered on unless the device security module 102 is coupled to the electronic device 110. The data security module 110 may, for example, be configured to receive the input when the user presses a button or otherwise indicates that the power should be turned on for the electronic device 110. The data security module 110 may refuse to forward that input unless the monitor module 109 determines that the device security module 102 is coupled to the electronic device 110.

In certain embodiments, the data security module 109 may prevent the electronic device 110 from operating, but allow the electronic device 110 to enter a pre-boot state for providing the user with messages and receiving user input. In such embodiments, the electronic device 110 does not operate unless the device security module 102 is properly coupled to the electronic device 110. If the user forgets to couple the electronic device 110 to the device security module 102 before trying to start the electronic device 110 as outlined above, the electronic device 110 will not operate. In certain embodiments, the electronic device 110 instead enters a pre-boot state where a message displays indicating that the electronic device 110 will not operate unless the device security module 102 is properly coupled to the electronic device 110.

When the user couples the device security module 102 to the electronic device 110, the data security module 104 may allow the user to operate the electronic device 110. If the user uncouples the device security module 102 and the electronic device 110 while the electronic device 110 is in operation, the monitor module 106 determines that the device security module 102 is no longer coupled to the electronic device 110 and the data security module 104 shuts down the electronic device 110. In one embodiment, the data security module 104 executes a graceful shutdown. In other embodiments, the data security module 104 executes a hard shutdown. Whether to execute a graceful shutdown or a hard shutdown may be a user-configurable option that is provided during setup of the lock system 100.

The device security module 102 protects the hardware value of the electronic device 110 by securing the electronic device 110 to a physical location. The system 100 also protects data by ensuring that the electronic device 110 cannot be operated if the device security module 102 is not coupled to the electronic device 110. The system 100 also encourages good security practices by requiring the user to couple the device security module 102 to the electronic device 110 before allowing the electronic device 110 to operate.

In certain embodiments, the system 100 takes further precautions to protect data within the electronic device 110. The monitor module 106 may also determine whether the device security module 102 is recognized. Such an approach may ensure that a potential thief cannot simply remove the device security module 102, steal the electronic device 110, and purchase a new device security module 102 to couple to the electronic device 110 and gain access to the electronic device 110 and the data stored thereon. The data security module 104 may be configured to prevent the electronic device 110 from operating in response to determining that the device security module 102 is unrecognized.

In one embodiment, the device security module 102 shares an authentication code with the monitor module 106. The monitor module 106 may use the authentication code to determine whether the device security module 102 is recognized. The authentication code is a unit of data that can be communicated between the device security module 102 and the data security module 104. In one embodiment, the monitor module 106 stores a copy of the expected authentication code and compares the authentication code received from the device security module 102 with the expected authentication code. If the expected authentication code does not match the authentication code provided by the device security module 102, the data security module 104 may prevent the electronic device 110 from operating.

The authentication code may be set by a user during set up of the system 100. In certain embodiments, the device security module 102 wireless transmits the authentication code to the monitor module 106. In certain embodiments, if the monitor module 106 does not recognize the device security module 102, the data security module 104 prevents the electronic device 110 from operating and also provides a preboot screen prompting the user to enter the authentication code. If the user provides the correct authentication code, the monitor module 106 may transmit the authentication code to the device security module 102 for later use, and the data security module 104 may allow the user to proceed with the process of accessing the electronic device 110. The device security module 102 may save the authentication code provided by the monitor module 106 for later use. In certain embodiments, on subsequent access attempts, the monitor module 106 will recognize the device security module 102 without requiring the user to provide the authentication code. Allowing the user the option of entering the authentication code if the device security module 102 is not recognized may ensure that the electronic device 110 can still be used in the event of the loss or destruction of the device security module 102. A similar approach may also be used if the data security module 104 is damaged or destroyed. Not allowing the electronic device 110 to operate unless various components are recognized provides an added measure of security. Allowing various components to be integrated into an existing system if the user can provide a proper authentication code ensures that damaged components can be replaced while still protecting security.

In certain embodiments, the device security module 102 may be programmable with the correct authentication code. The device security module 102 may have input tools that allow the user to enter the authentication code directly on the device security module 102. In other embodiments, the device security module 102 can only be accessed by, and the authentication code provided by, specialized security software. In such embodiments, an IT professional in a company's IT department may be required to connect to and provide the authentication code to the device security module 102.

In certain embodiments, the correct authentication code is hard-coded into the device security module 102. If the monitor module 106 does not recognize the device security module 102, it may prompt the user to enter a password (such as the encryption key described below). If the user enters the correct password, the monitor module 106 may accept the authentication code that is hard-coded into the device security module 102 as the correct authentication code and synchronize the device security module 102 and the monitor module 106 such that the device security module 102 (and its associated authentication code) is recognized in the future. Other approaches for ensuring that the monitor module 106 recognizes the device security module 102 may also be used.

In such embodiments, the system 100 may thus implement another layer of security: first, the device security module 102 may need to be coupled to the electronic device 110; second, the device security module 102 may need to be recognized. In certain embodiments, the data security module 104 only allows the electronic device 110 to operate if both of these conditions are met.

Figure 2:
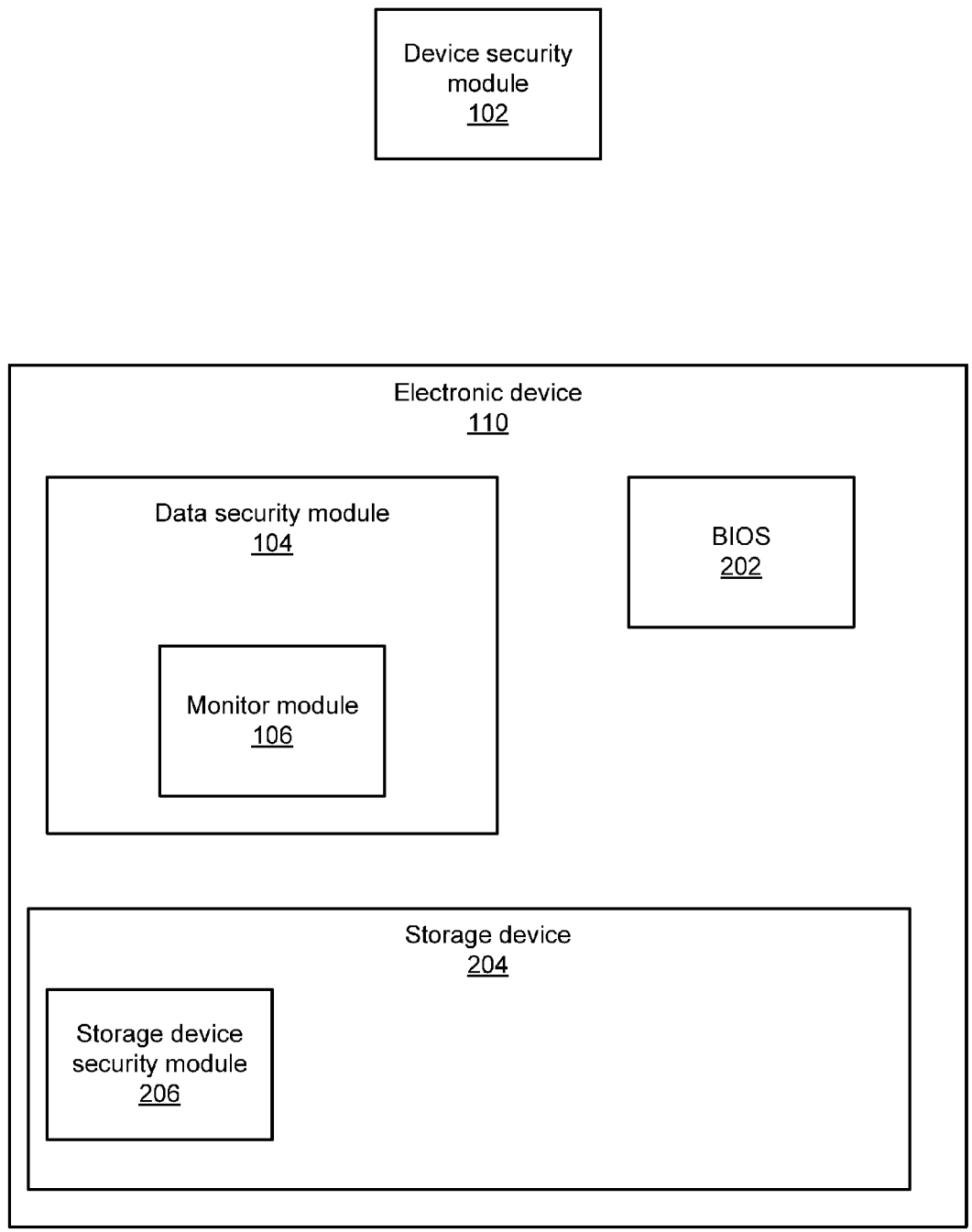
FIG. 2 is a schematic block diagram illustrating an embodiment of a device security module and an electronic device with a data security module and storage device.

Additional security measures may also be taken to protect data on the electronic device 110. FIG. 2 shows a second embodiment of a system that includes a device security module 102 and an electronic device 110 including a data security module 104, BIOS 202, and a storage device 204. The electronic device 110 typically includes more components then those shown in FIG. 2, which has been simplified for ease of illustration.

In certain embodiments, the storage device 204 includes a storage device security module 206. The storage device 204 may be any memory suitable for storing data in a nonvolatile medium. The storage device 204 may be a solid state drive (SSD), hard disk drive (HDD), a hybrid drive, or other memory suitable for storing data.

The storage device 204 may include a storage device security module 206. The storage device security module 206 may encrypt data on the storage device 204 using an encryption key. The storage device security module 206 may be implemented as hardware, firmware, software, or a combination thereof. In certain embodiments, the storage device security module 206 encrypts all data on the storage device 204 using the encryption key. In certain embodiments, the storage device security module 206 encrypts the address scheme sectors on the storage device 204.

The storage device security module 206 may receive the encryption key from the data security module 104. The data security module 104 may prompt the user to enter the encryption key in a pre-boot screen. In certain embodiments, the data security module 104 requests the encryption key from the user each time the user attempts to start up the electronic device 110. If the user provides the correct encryption key, the data on the storage device 204 may be correctly decrypted and the data on the storage device 204 can be accessed.

The storage device security module 206 may be implemented at one or more locations in the electronic device 110. In certain embodiments, the storage device security module 206 is implemented on the storage device 204. Implementing a storage device security module 206 on the storage device 204 may provide additional data security since the data remains protected even if the storage device 204 is removed from the electronic device 110. In one embodiment, the storage device security module 206 may limit the number of attempts by the user to enter the encryption key for the storage device 204. The storage device security module 206 may store a number (referred to as a drive threshold attempt number) that indicates how many attempts are permissible. The drive threshold attempt number may be initially set to a default value that is configurable by the user. In certain embodiments, the storage device security module 206 logs the number of attempts by the user to enter the encryption key and compares that number to the drive threshold attempt number. If the number of attempts exceeds the drive threshold attempt number, the storage device security module 206 may destroy data in the storage device 204.

The destruction of data in the storage device 204 may be logical destruction, physical destruction, or a combination thereof. Logical destruction refers to corrupting the data on the storage device 204 so as to render the data meaningless or inaccessible. In one embodiment, the storage device security module 206 may overwrite sectors of the storage device 204. The storage device security module 206 may corrupt the address scheme of the storage device 204. The storage device security module 206 may systematically make random writes on the storage device to corrupt the data until the original data is unusable. Other approaches to logically destroying data may also be used.

In certain embodiments, the storage device security module 206 may physically destroy the storage device 204. In one embodiment, the storage device 204 may be a HDD, and the storage device security module 206 may deliberately cause head crashes to occur on the platters. The storage device security module 206 may cause these head crashes to occur in a systematic fashion that covers the entire disk and thereby destroys the data on the disk. In certain embodiments, the storage device may be an SSD. In such embodiments, the storage device security module 206 may intentionally provide too much voltage for the device and destroy memory cells. Other approaches to physically destroying the storage device 204 may also be used. Thus, in certain embodiments, the storage device security module 206 may cooperate with the other components to provide data security even if the storage device 204 is removed from the electronic device 110.

In certain embodiments, the data security module 104 communicates with the BIOS 202. BIOS 202 provides a firmware interface for the electronic device 110 and loads and starts the operating system in many systems. The term BIOS is used broadly in this application to encompass other approaches to providing interfaces and startup functionality, including (but not limited to) extensible firmware interface (EFI), uniform extensible firmware interface (UEFI), and other interfaces. In certain embodiments, the data security module 104 may prevent the electronic device 110 from operating by stopping the BIOS 202. When the electronic device 110 is being powered on, the data security module 104 may prevent the BIOS 202 from loading the operating system until the monitor module 106 determines that the device security module 102 is coupled and recognized, and the user provides the encryption key. The data security module 104 may maintain control of the electronic device 110 until the above criteria are met, at which point the data security module 104 may pass control to the BIOS 202.

As discussed above, the storage device security module 206 may limit the number of attempts by the user to enter the encryption key and gain access to the storage device 204. The data security module 104 may also limit the number of attempts by the user to enter the encryption key to a threshold number. The threshold attempt number used by the data security module 104 may be the same as the drive threshold attempt number used by the storage device security module 206. In other embodiments, the respective threshold attempt numbers are different.

In certain embodiments, if the data security module 104 determines that the user has exceeded the permissible number of attempts to enter the encryption key, the data security module 104 disables the BIOS 202. In certain embodiments, the data security module 104 logically disables the BIOS 202. In other embodiments, the data security module 104 physically disables the BIOS 202. In certain embodiments, the BIOS 202 can be reset after it has been disabled. Security software may be used to reset the BIOS 202, and the electronic device 110 may thereafter be restored to an operational state.

Figure 3:
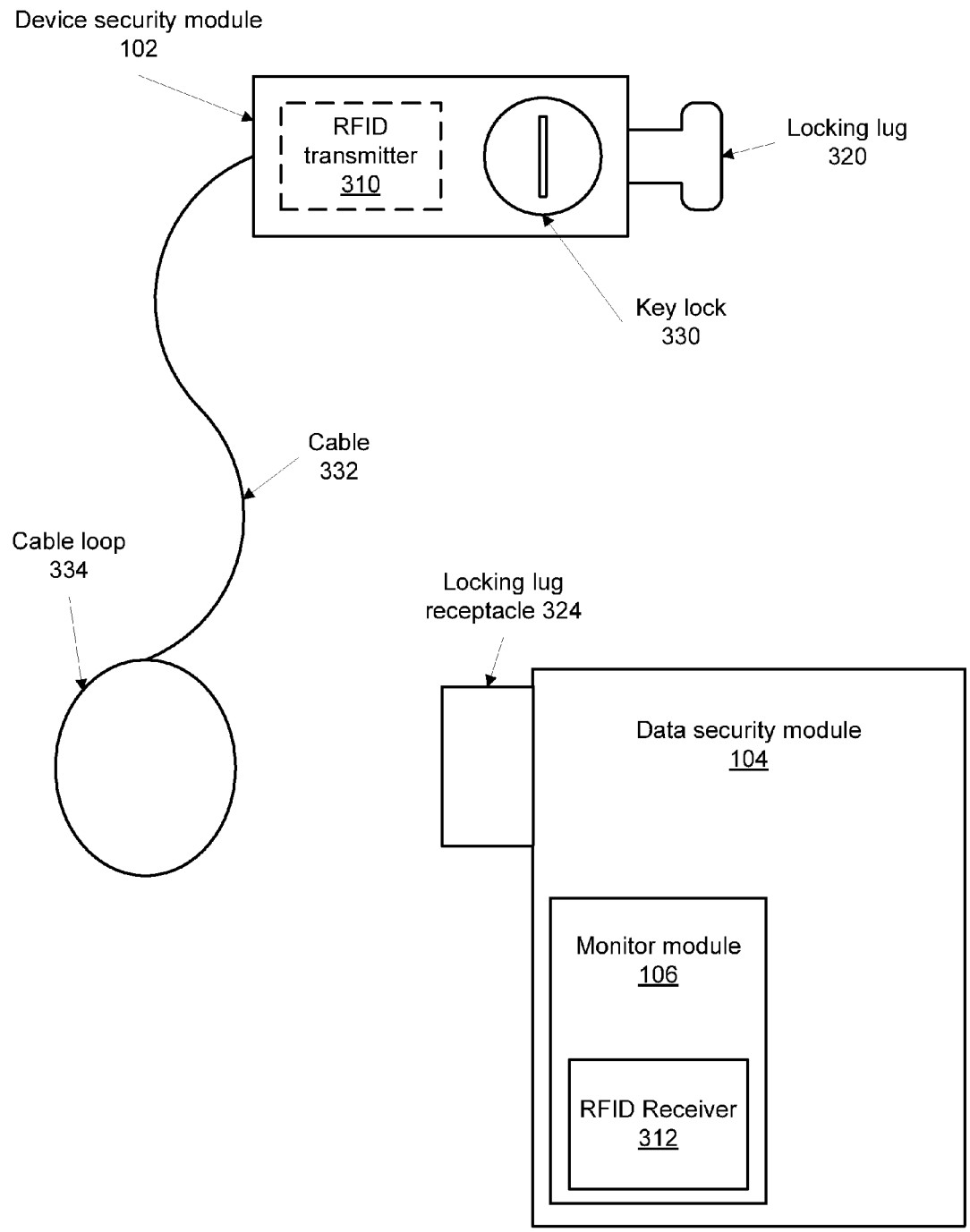
FIG. 3 is a schematic block diagram illustrating an embodiment of a device security module and a data security module.

FIG. 3 shows one embodiment of a device security module 102 and a data security module 104. These may be referred to collectively as a lock. In one embodiment, the device security module 102 includes a locking lug 320, a key lock 330, a radio frequency identification (RFID) transmitter 310, and a cable 332 with a cable loop 334. The data security module 104 may include a locking lug receptacle 324 and a monitor module 106 with an RFID receiver 312.

In certain embodiments, the data security module 104 is designed to fit within the outer shell of an electronic device 110 such as the electronic device 110 shown in FIG. 1. In such embodiments, the device security module 102 may be coupled to the electronic device 110 by connecting to the data security module 104. For example, the data security module 104 may fit within the outer shell of a laptop computer. In certain embodiments, the outer shell of the electronic device 110 provides an aperture that exposes the locking lug receptacle 324. In such embodiments, the user may wrap the cable 332 around a secure object, pass the body of the device security module 102 through the cable loop 334, and insert the locking lug 320 into the locking lug receptacle 324. When the user locks the device security module 102 using the key lock 330, the electronic device 110 is coupled to the device security module 102 and the electronic device 110 is secured to the particular physical location. Other configurations of a device security module 102 can also be used to secure the electronic device 110 to a particular physical location. The present invention is not limited to the configuration shown in FIG. 3.

FIG. 3 shows a key lock 330 that co-operates with a key to engage the device security module 102 and place it in a locked position. In certain embodiments, the device security module 102 does not use a key lock 330. The device security module 102 may use a keypad that allows the user to enter an alphanumeric code. The device security module 102 may include a biometric scanner such as a fingerprint scanner. Other approaches to allow a user to place the device security module 102 in a locked and unlocked position may also be used.

In certain embodiments, the device security module 102 includes an RFID transmitter 310 that communicates with the RFID receiver 312 of the monitor module 106. The device security module 102 and the monitor module 106 may share the authentication code discussed above using the RFID transmitter 310 and RFID receiver 312. As discussed above, the monitor module 106 may use the authentication code to determine whether the device security module 102 is recognized. In certain embodiments, the device security module 310 may have the RFID receiver 312 and the data security module 104 the RFID transmitter 310. In certain embodiments, both the device security module 102 and the data security module 104 are capable of both sending and receiving information and have components for both transmission and reception. While FIG. 3 shows the use of RFID technology, other forms of communication may also be used. In certain embodiments, the device security module 102 and the data security module 104 communicate using Bluetooth or other wireless communications technologies. The data security module 104 and/or the device security module 102 may also monitor the cable 332 (including the cable loop 334) to determine whether the cable 332 or the cable loop 334 has been cut. The data security module 104 may be configured to prevent the electronic device 110 from operating if the cable 332 has been cut.

In certain embodiments, the locking lug receptacle 324 also contains one or more sensors that determine whether the locking lug 320 is coupled to the locking lug receptacle 324. In certain embodiments, the device security module 102 also includes sensors to determine whether the key lock 330 has been placed in a locked position. The device security module 102 may be configured to share this information with the monitor module 106. In certain embodiments, both the device security module 102 and the locking lug receptacle 324 include sensors to determine whether the locking lug 320 is in the locking lug receptacle 320 and the key lock 330 is in a lock position. The monitor module 106 may be configured to require that both the sensors in the data security module 104 and the sensors in the device security module 102 indicate that they are connected and locked before the monitor module 106 will determine that the device security module 102 is coupled to the electronic device 110, causing the data security module 104 to allow the electronic device 110 to operate.

The monitor module 106 may continuously monitor the status of the connection between the device security module 102 and the data security module 104. If, at any point, the monitor module 106 determines that the device security module 102 is not coupled to the electronic device 110, the data security module 104 may prevent the electronic device 110 from operating. If the electronic device 110 is already off, the data security module 104 may not allow the electronic device 110 to be powered on, or may not allow the electronic device 110 to proceed past a pre-boot screen. If the electronic device 110 is on when the monitor module 106 determines that the data security module 104 and the device security module 102 are not coupled, the data security module 104 may cause the electronic device 110 to shut down.

Thus, in certain embodiments, the electronic device 110 will not work if the device security module 102 is not connected to the data security module 104 and thus coupled to the electronic device 110. In certain embodiments, the electronic device 110 will also not work unless the authentication code shared by the device security module 102 and the monitor module 106 is correct. This approach may provide greater security for both the electronic device 110 and the data stored thereon.

Figure 4A:
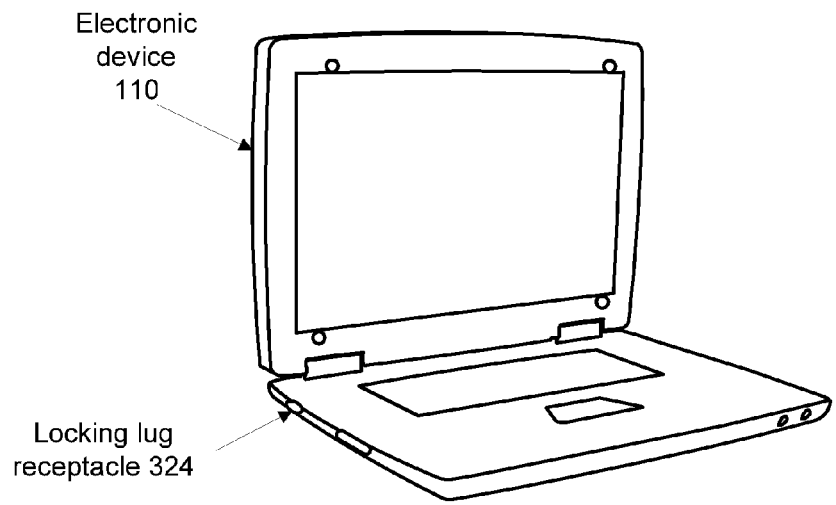
FIGS. 4A and 4B are illustrations of an electronic device secured by a device security module.

FIG. 4A shows an embodiment of an electronic device 110 that is a laptop. In FIG. 4A, the data security module 104 is installed within the outer shell of the electronic device 110, with the locking lug receptacle 324 exposed. The data security module 104 may be installed within the electronic device 110 and communicating with the BIOS 202 of the electronic device 110. As described above, the data security module 104 may control whether the BIOS 202 is operational or not, and may prevent the BIOS 202 from functioning unless the device security module 102 is attached. In this manner, the data security module 104 may prevent the electronic device 110 from operating without the device security module 102. In certain embodiments, if a user attempts to start the electronic device 110 without the device security module 102 coupled thereto, the data security module 104 may alert the user, using the screen of the electronic device 110, that the electronic device 110 cannot operate unless a recognized device security module 102 is attached.

Figure 4B:
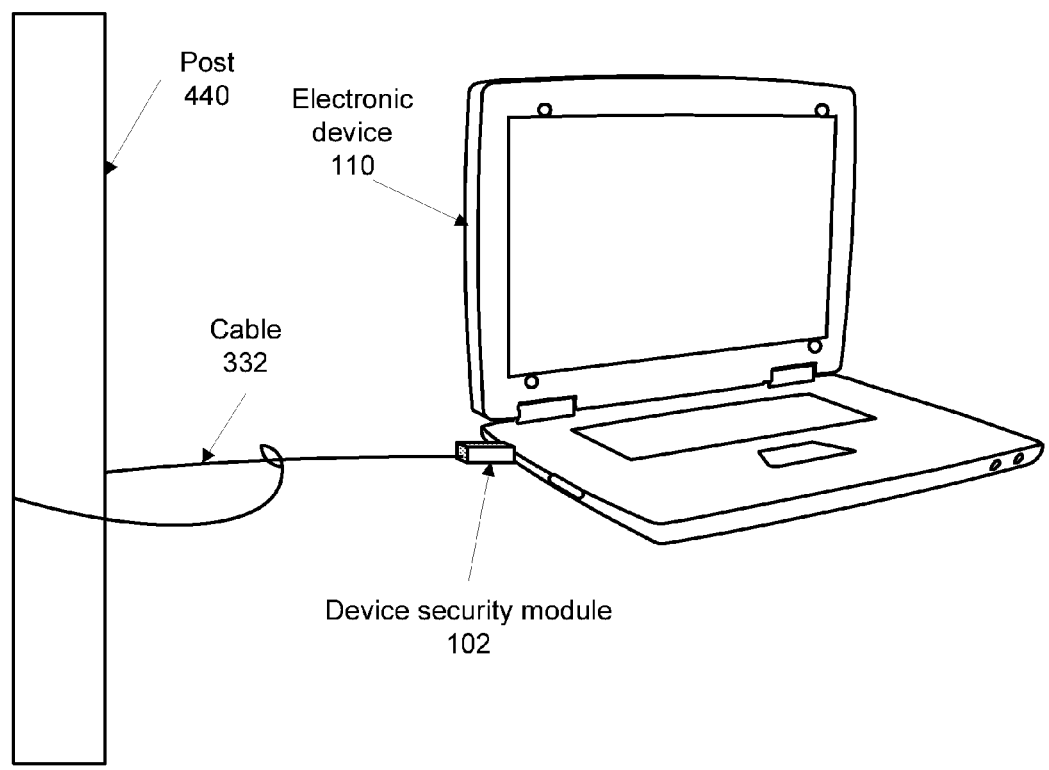

FIG. 4B shows one embodiment of an electronic device 110 with a device security module 102 coupled thereto, and securing the electronic device 110 to a physical location by way of the post 440. In FIG. 4B, the monitor module 106 may determine that the device security module 102 is coupled to the electronic device 102. The monitor module 106 may also determine whether the device security module 102 is recognized. In certain embodiments, if the device security module 102 is not recognized, the data security module 104 prevents the electronic device 110 from operating even though the device security module 102 is coupled to the electronic device 102. The device security module 102 may display a message on the screen for the user if the device security module 102 is coupled to the electronic device 110 but is not recognized. The message may inform the user why the electronic device 110 will not operate.

If the user has attached the wrong device security module 102, the user can get the correct device security module 102 and connect it. If the device security module 102 was damaged, lost, or otherwise not available, the user may associate a new device security module 102 such that the device security module 102 will be recognized, as described above. The user may need to provide the correct authentication code in order to associate the new device security module 102 with the data security module 104. In certain embodiments, the user must provide the encryption key to associate the new device security module 102 with the data security module 104.

The electronic device 110 may also include a storage device 204 with a storage device security module 206. The storage device security module 206 may be installed as firmware on the storage device 204. As discussed above, the storage device 204 may be encrypted. In certain embodiments, if the device security module 102 is coupled to the electronic device 110 and is recognized, the data security module 104 prompts the user to enter the encryption key. The data security module 104 and/or the storage device security module 206 may limit the number of attempts by the user to correctly enter the encryption key before destroying and/or disabling the electronic device 110 and/or the data stored therein. Once the user provides the encryption key, the data security module 104 may allow the electronic device 110 to operate.

Figure 5:
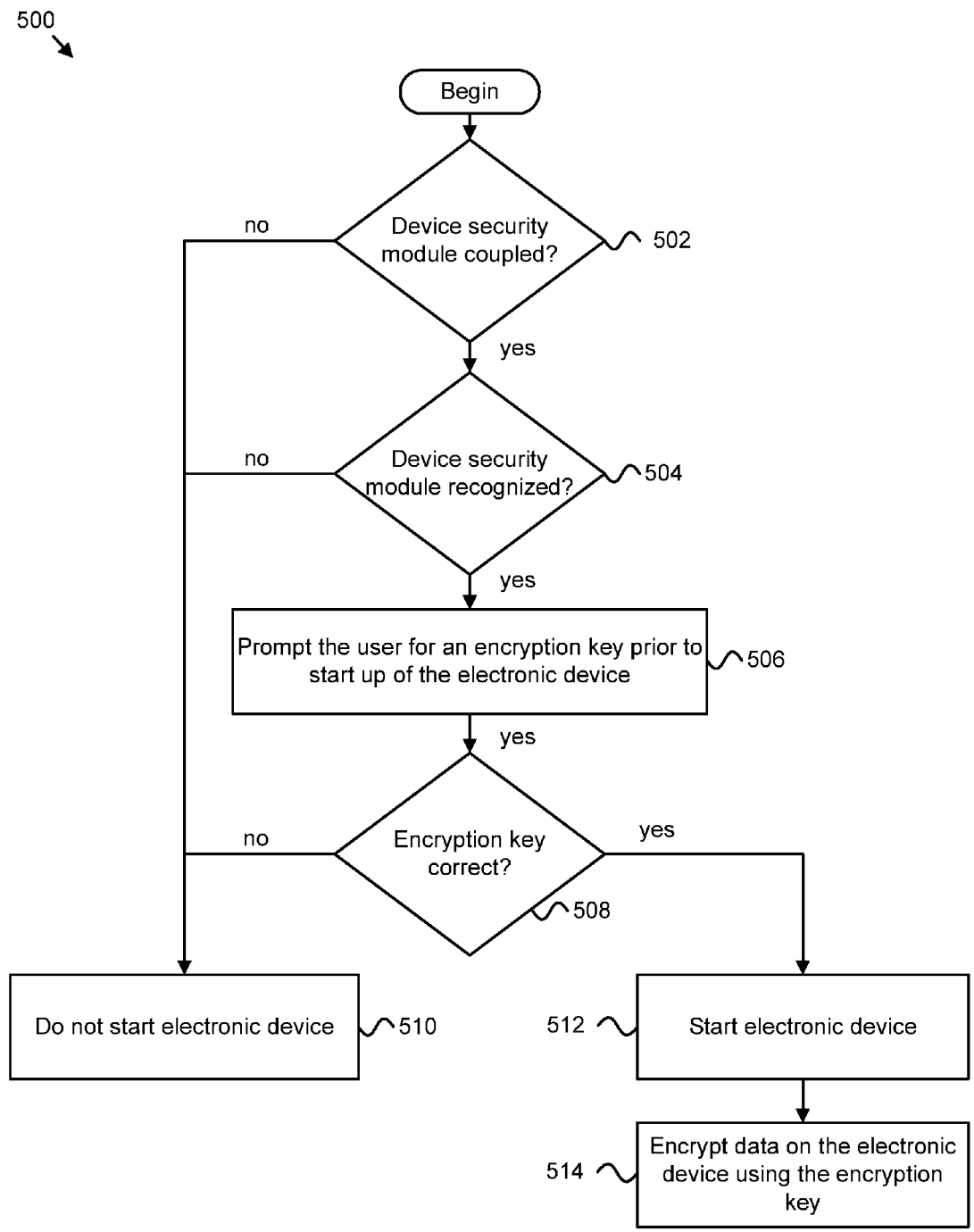
FIG. 5 is a flow chart diagram illustrating an embodiment of a method for securing an electronic device.

FIG. 5 shows one embodiment of a method 500 for securing an electronic device 110. The steps shown in FIG. 5 need not be performed in the order shown. In certain embodiments, more or steps may be taken then those shown. In certain embodiments, steps shown in FIG. 5 may be omitted. In certain embodiments, the method 500 may be implemented by a computer program executing on a computer readable medium.

In one embodiment, the method 500 begins with determining 502 whether the device security module 102 is coupled to the electronic device 110. The method 500 may also involve determining 504 whether the device security module 102 is recognized. If the device security module 102 is not coupled to the electronic device 110, or the device security module 102 is not recognized, the method may terminate by not starting 510 the electronic device 110. If the electronic device 110 is operational, step 510 may involve shutting down the electronic device 110.

If the device security module 102 is coupled to the electronic device 110, and the device security module 102 is recognized, the method may involve prompting 506 the user for an encryption key prior to start up of the electronic device. As noted above, this may be done from a preboot screen on the electronic device 110. In other embodiments, the user enters the encryption key on the device security module 102. If the encryption key is correct 508, the electronic device 110 starts 512, and data is encrypted and decrypted on the electronic device 110 using the encryption key. If the encryption key is incorrect, the electronic device 110 does not start 510. In certain embodiments, the data security module 104 determines that the encryption key is incorrect and blocks further operations. In other embodiments, the data security module 104 allows the boot process to proceed once the encryption key is provided, if the other conditions for allowing the electronic device 110 to proceed to operation are met. Where the encryption key is incorrect, the resulting errors in the attempt to load the operation system and access data in the electronic device 110 may prevent operation without any action on the part of the data security module 104.

In certain embodiments, where the encryption key is entered incorrectly, the data security module 104 may note the incorrect entry and compare the number of unsuccessful attempts to provide the encryption key with a threshold attempt number. A storage device security module 206 may do the same. In certain embodiments, the method may include disabling the BIOS 202 of the electronic device 110 if the number of attempts by the user exceeds the threshold attempt number. The method may also include destroying data on the electronic device 110 if the number of attempts to enter the encryption key exceeds the threshold attempt number. As mentioned above, the threshold attempt number required before disabling of the BIOS 202 occurs may be different from the drive threshold attempt number required before destroying the data.

In certain embodiments, the threshold attempt number may be stored in permanent memory. Storing the threshold attempt number in permanent memory may prevent would-be hackers from resetting the threshold attempt number by power cycling or by removing batteries.

Figure 6:
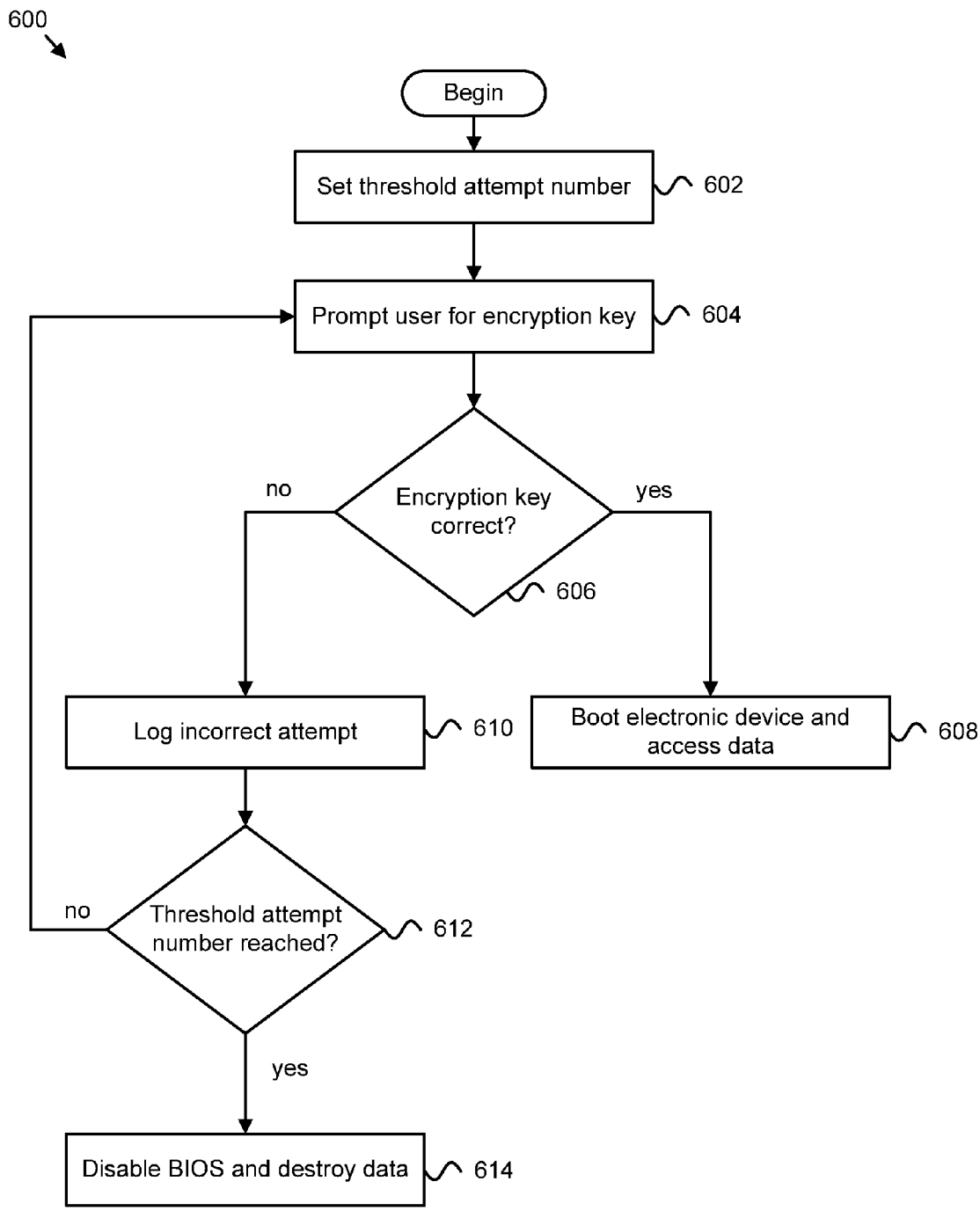
FIG. 6 is a flow chart diagram illustrating an embodiment of a method for preventing repeated attempts at circumventing an encryption key.

FIG. 6 shows one embodiment of a method 600 for preventing thieves from circumventing an encryption key. The method 600 may begin with a user setting 602 a threshold attempt number. The threshold attempt number may also have a default value that is user configurable. The method 600 may further include prompting 604 the user for the encryption key for the electronic device 110. If the encryption key is correct 606, the method 600 may further involve booting 608 the electronic device 110 and allowing access to data. As discussed above, the action taken may depend on where the method 600 is implemented; for example, the storage device security module 206 may allow access to the data if the encryption key is correct. The data security module 104 may boot the electronic device 110 if the encryption key is correct.

If the encryption key is not correct, the method 600 may involve logging 610 the incorrect attempt. As noted above, the log may be stored in permanent memory to prevent hackers from resetting the threshold attempt number by power cycling. If the threshold attempt number has not been reached 612, the method 600 may involve again prompting 604 the user for the encryption key and repeating until the user either provides the correct encryption key or the user exhausts the allowable attempts.

If the threshold attempt number is reached, the method 600 may involve disabling 614 the BIOS and destroying the data on the electronic device 110. The data security module 104 may disable the BIOS, while the storage device security module 206 destroys the data. These steps may not necessarily occur together; for example, the threshold attempt number for disabling the BIOS may be smaller than the threshold attempt number for destroying the data. If a hacker removes the storage device 204 and inserts it into another machine in an attempt to access the data, the method 600 may involve the storage device security module 306 destroying the data without disabling of the BIOS of the hacker's machine.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lock for an electronic device, the lock comprising:
   a device security module that couples to the electronic device and secures the electronic device to a physical location;
   a monitor module that determines whether the device security module is coupled to the electronic device;
   a storage device security module that encrypts data on the electronic device with an encryption key, wherein the storage device security module is a part of a storage device of the electronic device; and
   a data security module that prevents the electronic device from operating in response to determining that the device security module is not coupled to the electronic device, wherein the data security module
      prevents the electronic device from being powered on unless the device security module is coupled to the electronic device; and
      requires that a user provide the encryption key before the startup of the electronic device.

2. The lock of claim 1, wherein the monitor module is further configured to determine whether the device security module is recognized, and wherein the data security module is further configured to prevent the electronic device from operating in response to determining that the device security module is unrecognized.

3. The lock of claim 2, wherein the device security module is further configured to share an authentication code with the monitor module, the monitor module using the authentication code to determine whether the device security module is recognized.

4. The lock of claim 1, wherein the data security module fits within the electronic device.

5. The lock of claim 1, wherein the data security module communicates with the basic input output system (BIOS) of the electronic device.

6. The lock of claim 5, wherein the data security module prevents the electronic device from operating by stopping the BIOS.

7. The lock of claim 1, wherein the data security module limits a number of attempts by a user to enter the encryption key.

8. The lock of claim 7, wherein the data security module disables the BIOS in response to the user exceeding a limit on the number of attempts by the user to enter the encryption key.

9. The lock of claim 1, wherein the storage device security module limits a number of attempts by a user to enter the encryption key, the storage device security module configured to operate on a storage device of the electronic device.

10. The lock of claim 9, wherein the storage device security module destroys data in the storage device in response to the user exceeding a limit on the number of attempts by the user to enter the encryption key.

11. The lock of claim 10, wherein the storage device security module destroys the data in the storage device by one or both of: physically destroying the storage device; and logically destroying the data in the storage device.

12. A locking system for an electronic device, the lock comprising:
    a device security module that couples to the electronic device and secures the electronic device to a physical location, wherein the device security module is external to the electronic device;
    a monitor module that determines whether the device security module is coupled to the electronic device;
    a storage device security module that operates on a storage device of the electronic device, the storage device security module encrypting data on the storage device with an encryption key provided by the user prior to startup of the electronic device; and
    a data security module that prevents the electronic device from operating in response to determining that the device security module is not coupled to the electronic device, wherein the data security module is located internal to the electronic device, prevents the electronic device from being powered on unless the device security module is coupled to the electronic device, and requires that a user provide the encryption key before the startup of the electronic device.

13. The system of claim 12, further comprising the electronic device, wherein the electronic device is one of a laptop computer, a cellular phone, a desktop computer, a personal digital assistant (PDA), and a tablet.

14. The system of claim 12, wherein the monitor module is further configured to determine whether the device security module is recognized, and wherein the data security module is further configured to prevent the electronic device from operating in response to determining that the device security module is unrecognized.

15. The system of claim 12, wherein the device security module is further configured to wirelessly communicate an authentication code with the monitor module, the monitor module using the authentication code to determine whether the device security module is recognized.

16. A computer program product, wherein the product is not a signal, for securing an electronic device, the computer program product comprising instructions for:
    determining whether a device security module is coupled to the electronic device;
    determining whether the device security module is recognized;
    prompting a user for an encryption key prior to startup of the electronic device; and
    allowing power to reach and start the electronic device, and encrypting and decrypting data on the electronic device using the encryption key, in response to determining that:
    the device security module is coupled to the electronic device; and
    the device security module is recognized.

17. The computer program product of claim 16, the instructions further comprising disabling a basic input output system (BIOS) of the electronic device in response to a number of attempts by a user to enter the encryption key exceeding a threshold attempt number.

18. The computer program product of claim 17, the instructions further comprising destroying data on the electronic device in response to the number attempts by the user to enter the encryption key exceeding the threshold attempt number.

* * * * *